(12) United States Patent
Goto et al.

(10) Patent No.: US 10,953,395 B2
(45) Date of Patent: Mar. 23, 2021

(54) HONEYCOMB STRUCTURE AND PRODUCTION METHOD FOR SAID HONEYCOMB STRUCTURE

(71) Applicants: IBIDEN CO., LTD., Ogaki (JP); TOYOTA JIDOSHA KABUSHIKI KAISHA, Toyota (JP)

(72) Inventors: Shinnosuke Goto, Ibi-gun (JP); Kenta Nomura, Ibi-gun (JP); Takumi Tojo, Toyota (JP); Takeru Yoshida, Toyota (JP); Hiromasa Suzuki, Toyota (JP)

(73) Assignees: IBIDEN CO., LTD., Ogaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/245,258

(22) Filed: Jan. 11, 2019

(65) Prior Publication Data
US 2019/0143313 A1 May 16, 2019

Related U.S. Application Data

(63) Continuation of application No. PCT/JP2017/025479, filed on Jul. 13, 2017.

(30) Foreign Application Priority Data

Jul. 14, 2016 (JP) .............................. JP2016-139686

(51) Int. Cl.
*B01J 35/04* (2006.01)
*B01J 23/63* (2006.01)
(Continued)

(52) U.S. Cl.
CPC .......... *B01J 35/04* (2013.01); *B01D 53/9445* (2013.01); *B01J 23/10* (2013.01); *B01J 23/63* (2013.01); *B01J 37/08* (2013.01); *C04B 35/80* (2013.01); *C04B 38/0006* (2013.01); *C04B 38/0645* (2013.01); *B01D 53/9454* (2013.01); *B01D 2255/1023* (2013.01); *B01D 2255/1025* (2013.01); *B01D 2255/2092* (2013.01);
(Continued)

(58) Field of Classification Search
CPC ... B01J 35/04; B01J 23/10; B01J 23/63; B01J 37/08; B01D 53/9445; C04B 35/80; C04B 38/0006; C04B 38/0645
See application file for complete search history.

(56) References Cited

U.S. PATENT DOCUMENTS

| | | | |
|---|---|---|---|
| 2014/0274676 A1* | 9/2014 | Liu | B01D 53/945 502/304 |
| 2015/0352492 A1* | 12/2015 | Andersen | B01J 37/0036 423/237 |
| 2015/0354099 A1* | 12/2015 | Ohshima | D04H 1/4209 428/401 |

FOREIGN PATENT DOCUMENTS

| | | |
|---|---|---|
| JP | 2007-290951 | 11/2007 |
| JP | 2007-296514 | 11/2007 |

(Continued)

*Primary Examiner* — James A Fiorito
(74) *Attorney, Agent, or Firm* — Mori & Ward, LLP

(57) ABSTRACT

The present invention relates to a honeycomb structured body including a honeycomb fired body in which multiple through-holes are arranged longitudinally in parallel with one another with a partition wall therebetween, wherein the honeycomb fired body is an extrudate containing ceria-zirconia composite oxide particles, θ-alumina particles, γ-alumina, and α-alumina fibers, and the honeycomb fired body has a porosity of 55 to 70%.

11 Claims, 1 Drawing Sheet

(51) Int. Cl.
*C04B 38/06* (2006.01)
*B01D 53/94* (2006.01)
*C04B 35/80* (2006.01)
*C04B 38/00* (2006.01)
*B01J 23/10* (2006.01)
*B01J 37/08* (2006.01)
*B01J 37/32* (2006.01)
*C04B 111/00* (2006.01)

(52) U.S. Cl.
CPC ......... *B01D 2255/407* (2013.01); *B01J 37/32* (2013.01); *C04B 2111/0081* (2013.01)

(56) References Cited

FOREIGN PATENT DOCUMENTS

| | | |
|---|---|---|
| JP | 2007-534483 | 11/2007 |
| JP | 2009-255029 | 11/2009 |
| JP | 2013-517935 | 5/2013 |
| JP | 2015-085241 | 5/2015 |
| WO | WO 2005/113126 | 12/2005 |
| WO | WO 2009/141878 | 11/2009 |
| WO | WO 2011/092519 | 8/2011 |

* cited by examiner

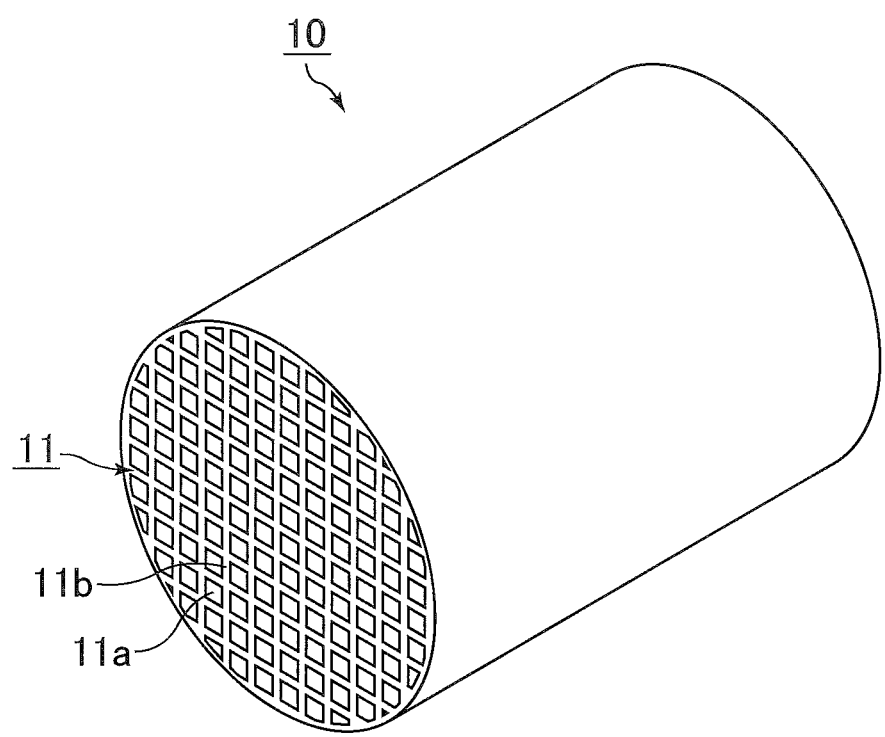

HONEYCOMB STRUCTURE AND PRODUCTION METHOD FOR SAID HONEYCOMB STRUCTURE

TECHNICAL FIELD

The present invention relates to a honeycomb structured body and a method for producing the honeycomb structured body.

BACKGROUND ART

Exhaust gas discharged from internal combustion engines of automobiles and the like contains harmful gases such as carbon monoxide (CO), nitrogen oxides (NOx), and hydrocarbons (HC). An exhaust gas catalytic converter that decomposes such harmful gases is also referred to as a three-way catalytic converter. A common three-way catalytic converter includes a catalyst layer that is formed by wash-coating a honeycomb-shaped monolithic substrate made of cordierite or the like with slurry containing noble metal particles having catalytic activity.

Meanwhile, Patent Literature 1 discloses an exhaust gas catalytic converter including a monolithic substrate containing ceria-zirconia composite oxide particles and θ-phase alumina particles, wherein a noble metal is supported on the monolithic substrate.

Patent Literature 2 discloses a honeycomb structured body as a honeycomb catalytic converter which mainly contains zeolite, wherein the total porosity of the cell walls is 40% or less, the porosity of the pores in the range of 0.005 to 0.02 μm is 5% or more, and the porosity of the pores in the range of 0.05 to 2 μm is 17.5% or more.

CITATION LIST

Patent Literature

Patent Literature 1: JP 2015-85241 A
Patent Literature 2: WO 2009/141878

SUMMARY OF INVENTION

Technical Problem

In the exhaust gas catalytic converter disclosed in Patent Literature 1, cordierite is not used as a material of the monolithic substrate, but a material that serves as a catalyst carrier and as a co-catalyst is used, whereby the bulk density is reduced and the monolithic substrate is easily heated. This is considered to contribute to improving warm-up performance of the catalytic converter. However, the bulk density of the exhaust gas catalytic converter disclosed in Patent Literature 1 is not considered to be sufficiently low, and a further improvement in warm-up performance is required.

The honeycomb catalytic converter disclosed in Patent Literature 2 has a specific pore distribution. Thus, the honeycomb catalytic converter may be able to achieve high conversion performance. However, the porosity of the honeycomb catalytic converter disclosed in Patent Literature 2 is not considered to be sufficiently high. Even if the honeycomb catalytic converter was produced using the materials described in Patent Literature 1, the honeycomb catalytic converter would not be easily warmed up during use, thus failing to achieve sufficient warm-up performance.

In an attempt to increase the porosity in order to improve warm-up performance, the porosity may be increased simply by using a pore-forming agent. However, in this case, the honeycomb catalytic converter, which mainly contains alumina and ceria-zirconia composite oxide particles having high thermal expansion coefficients, is unfortunately easily breakable during production.

The present invention has been made to solve the above problem, and aims to provide a honeycomb structured body and a method for producing the honeycomb structured body, wherein the method can produce a honeycomb structured body having high porosity even when the honeycomb structured body contains multiple types of particles in combination, and the honeycomb structured body has an excellent exhaust gas conversion function and exhibits excellent warm-up performance.

Solution to Problem

The honeycomb structured body of the present invention to achieve the above object is a honeycomb structured body including a honeycomb fired body in which multiple through-holes are arranged longitudinally in parallel with one another with a partition wall therebetween, wherein the honeycomb fired body is an extrudate containing ceria-zirconia composite oxide particles, θ-alumina particles, γ-alumina, and α-alumina fibers, and the honeycomb fired body has a porosity of 55 to 70%.

In the honeycomb structured body, the honeycomb fired body is an extrudate containing ceria-zirconia composite oxide particles, θ-alumina particles (θ-phase alumina particles), γ-alumina, and α-alumina fibers, and has a porosity of 55 to 70% which is sufficiently high. Thus, the honeycomb structured body exhibits excellent warm-up performance.

The pore size and porosity can be measured by mercury porosimetry with a contact angle of 130° and a surface tension of 485 mN/m.

The term "warm-up performance" of a catalytic converter as used herein refers to the period of time required for the catalytic converter to exhibit sufficient exhaust gas conversion performance after the engine has started. The warm-up performance is considered to be excellent when the catalytic converter can exhibit sufficient exhaust gas conversion performance within a short period of time after the engine has started.

In the honeycomb structured body, since the honeycomb fired body is an extrudate containing ceria-zirconia composite oxide particles, γ-alumina, θ-alumina particles, and α-alumina fibers, the honeycomb structured body has sufficient mechanical strength while its porosity is high. In addition, since the θ-alumina particles and the γ-alumina are less likely to undergo phase change simultaneously, a reduction in the specific surface area is suppressed, and the honeycomb structured body achieves sufficient conversion performance when used as a honeycomb catalytic converter.

In the honeycomb structured body of the present invention, a noble metal is preferably supported on the honeycomb fired body. The honeycomb structured body in which a noble metal that functions as a catalyst is supported on the honeycomb fired body can be used as a honeycomb catalytic converter for exhaust gas conversion.

The method for producing a honeycomb structured body of the present invention is a method for producing a honeycomb structured body including a honeycomb fired body in which multiple through-holes are arranged longitudinally in parallel with one another with a partition wall therebetween, the method including: a raw material paste preparing step of preparing a raw material paste; a molding step of molding the raw material paste into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step into a honeycomb fired body, wherein the raw material paste contains, relative to the total solid residue in the raw material paste after the firing step, 40 to 60% by weight of ceria-zirconia composite oxide particles, 15 to 35% by weight of θ-alumina particles, 5 to 15% by weight of α-alumina fibers, 5 to 20% by weight of boehmite as a binder, and one or more pore-forming agents.

According to the method for producing a honeycomb structured body, since the ceria-zirconia composite oxide particles, θ-alumina particles, α-alumina fibers, boehmite, and one or more pore-forming agents are used in the percentages described above, the method can produce a honeycomb structured body which exhibits excellent mechanical characteristics while its porosity is high, and which exhibits excellent conversion performance when used as a honeycomb catalytic converter.

In the method for producing a honeycomb structured body of the present invention, at least two of acrylic resin, coke, and starch are preferably used as the pore-forming agents.

In the method for producing a honeycomb structured body of the present invention, use of at least two of acrylic resin, coke, and starch as the pore-forming agents makes it possible to control the amount of heat generation during degreasing and firing of the honeycomb molded body, and to prevent breakage resulting from a large amount of heat generation during production of the honeycomb structured body having high porosity.

In the method for producing a honeycomb structured body, the honeycomb molded body obtained in the molding step is preferably freeze-dried in the drying step.

According to the method for producing a honeycomb structured body, freeze-drying of the honeycomb molded body allows a large amount of the water in the raw material paste to sublimate directly from the frozen state. Thus, relatively large pores can be easily formed, making it possible to produce a honeycomb structured body in which surrounding exhaust gas easily diffuses into the pores and which exhibits higher conversion performance when it is used as a honeycomb catalytic converter.

The method for producing a honeycomb structured body of the present invention preferably further includes a supporting step of allowing a noble metal to be supported on the honeycomb fired body.

The honeycomb structured body can be used as a honeycomb catalytic converter for exhaust gas conversion with a noble metal supported on the honeycomb fired body.

BRIEF DESCRIPTION OF DRAWINGS

FIG. 1 is a perspective view schematically showing an exemplary honeycomb structured body of the present invention.

DESCRIPTION OF EMBODIMENTS (Honeycomb Structured Body)
First, the honeycomb structured body of the present invention is described.

The honeycomb structured body of the present invention includes a honeycomb fired body in which multiple through-holes are arranged longitudinally in parallel with one another with a partition wall therebetween.

In the honeycomb structured body of the present invention, the honeycomb fired body is an extrudate containing ceria-zirconia composite oxide particles (hereinafter referred to as "CZ particles"), θ-alumina particles, γ-alumina, and α-alumina fibers.

Whether or not the honeycomb structured body of the present invention contains the above-described components can be confirmed by X-ray diffraction (XRD).

The honeycomb fired body may be produced by any method, but preferably by a method of extrusion-molding a raw material paste containing 40 to 60% by weight of ceria-zirconia composite oxide particles, 15 to 35% by weight of θ-alumina particles, 5 to 15% by weight of α-alumina fibers, 5 to 20% by weight of boehmite as a binder, and one or more pore-forming agents, and firing the resulting extrudate.

The honeycomb structured body of the present invention may include a single honeycomb fired body or multiple honeycomb fired bodies. The multiple honeycomb fired bodies may be combined together with an adhesive layer therebetween.

In the honeycomb structured body of the present invention, a peripheral coat layer may be formed on the outer periphery of the honeycomb fired body.

FIG. 1 is a perspective view schematically showing an exemplary honeycomb structured body of the present invention.

A honeycomb structured body 10 shown in FIG. 1 includes a single honeycomb fired body 11 in which multiple through-holes 11a are arranged longitudinally in parallel with one another with a partition wall 11b therebetween. The honeycomb fired body 11 contains CZ particles, θ-alumina particles, γ-alumina, and α-alumina fibers, and is in the form of an extrudate.

Since the honeycomb fired body constituting the honeycomb structured body of the present invention contains CZ particles, θ-alumina particles, γ-alumina, and α-alumina fibers, the honeycomb structured body has sufficient mechanical strength while its porosity is high. In addition, since the θ-alumina particles and the γ-alumina are less likely to undergo phase change simultaneously during production of the fired body, a reduction in the specific surface area is suppressed, and the honeycomb structured body achieves sufficient conversion performance when used as a honeycomb catalytic converter.

The honeycomb structured body containing θ-alumina particles can have a higher percentage of 3D net-like pores of a macropore size and can also have a higher percentage of micropores. Such a honeycomb structured body achieves high conversion performance when used as a honeycomb catalytic converter. In addition, with the use of the θ-phase alumina particles, it is possible to prevent phase change of the alumina in exhaust gas and achieve higher heat resistance.

Production of the honeycomb structured body requires a binder. When boehmite is added as a binder, a large part thereof is turned into γ-alumina by firing. Thus, the resulting fired body contains γ-alumina. In addition, the presence of the α-alumina fibers in the fired body can improve the mechanical characteristics of the honeycomb structured body.

In the honeycomb structured body of the present invention, the θ-alumina particle content is preferably 15 to 35% by weight.

In the honeycomb structured body of the present invention, the CZ particle content is preferably 35 to 65% by weight.

The γ-alumina content is preferably 5 to 20% by weight, and the α-alumina fiber content is preferably 5 to 15% by weight.

In the honeycomb structured body of the present invention, the CZ particles serve as a catalyst carrier and as a co-catalyst in exhaust gas conversion, and thus facilitate catalytic reaction. The CZ particles constituting the honeycomb structured body preferably have an average particle size of 1 to 10 μm. Preferably, the CZ particles includes cracked particles.

The CZ particles are particles having a high coefficient of thermal expansion. When the CZ particles have an average particle size of 1 to 10 μm and have cracks in the particles, thermal expansion or thermal contraction of the CZ particles can be absorbed by the cracks in the particles. As a result, thermal shock damage to the entire honeycomb structured body can be prevented, resulting in a honeycomb structured body having high thermal shock resistance.

Whether or not the CZ particles includes cracked particles can be confirmed by observation of an electron microscope image of the honeycomb fired body. In the electron microscope image of the honeycomb fired body, if a crack is found in three or more out of ten ceria-zirconia composite oxide particles, it is determined that the CZ particles includes cracked particles.

The average particle sizes of the CZ particles and the alumina particles constituting the honeycomb fired body can be determined by taking an SEM image of the honeycomb fired body with a scanning electron microscope (SEM "S-4800" available from Hitachi High-Technologies Corporation).

The honeycomb fired body constituting the honeycomb structured body of the present invention has a porosity of 55 to 70%.

This results in a low bulk density, a large surface area, and excellent warm-up performance.

The porosity and pore size distribution can be measured by mercury porosimetry with a contact angle of 130° and a surface tension of 485 mN/m.

If the honeycomb fired body has a porosity lower than 55%, the percentage of closed pores is high, which makes it difficult to increase the surface area of the honeycomb structured body and thus to improve the conversion performance. In contrast, if the honeycomb fired body has a porosity higher than 70%, the porosity is so high that the honeycomb structured body has poor mechanical characteristics, and the honeycomb structured body is susceptible to problems such as cracks and breakage during use.

The pore size distribution in the partition wall of the honeycomb fired body can be measured by mercury porosimetry as described above. Preferably, the honeycomb fired body constituting the honeycomb structured body of the present invention has a large percentage of small pores having a size of 0.01 to 0.1 μm. Specifically, the volume of pores having a size of 0.1 μm or less is preferably 50% by volume or more relative to the total pore volume.

When the percentage of micropores having a pore size with a peak in range of 0.01 to 0.1 μm is high, many irregularities attributable to the micropores are formed inside the partition walls. Thus, the surface on which the noble metal as a catalyst is supported has a larger surface area, which increases the contact between the noble metal and the exhaust gas in the pores. Thus, the honeycomb catalytic converter that uses the honeycomb structured body of the present invention achieves high conversion performance.

Yet, preferably, the honeycomb fired body also contains a certain percentage of macropores having a pore size in the range of 0.1 to 5 μm. When the honeycomb fired body contains a certain percentage of micropores having a pore size with a peak in the range of 0.1 to 5 μm, surrounding exhaust gas easily diffuses into the pores when the honeycomb structured body is used as a honeycomb catalytic converter with a noble metal or the like supported on the honeycomb fired body.

In the honeycomb structured body of the present invention, in order to reduce the temperature distribution of the honeycomb structured body when heated, the ratio of length to diameter (length/diameter) of the honeycomb structured body is preferably 0.5 to 0.9, and the diameter of the honeycomb structured body is preferably 130 mm or less.

The shape of the honeycomb structured body of the present invention is not limited to a round pillar shape. Examples of the shape include a rectangular pillar shape, a cylindroid shape, a pillar shape with a racetrack end face, and a rectangular pillar shape with rounded corners (e.g., a triangular pillar shape with rounded corners).

In the honeycomb structured body of the present invention, the shape of the through-holes of the honeycomb fired body is not limited to a quadrangular pillar shape. For example, it may be a triangular pillar shape or a hexagonal pillar shape.

In the honeycomb structured body of the present invention, the density of the through-holes in a cross section perpendicular to the longitudinal direction of the honeycomb fired body is preferably 31 to 155 pcs/cm$^2$.

In the honeycomb structured body of the present invention, the thickness of the partition wall of the honeycomb fired body is preferably 0.05 to 0.50 mm, more preferably 0.10 to 0.30 mm.

In the honeycomb structured body of the present invention, when a peripheral coat layer is formed on the outer periphery of the honeycomb fired body, the thickness of the peripheral coat layer is preferably 0.1 to 2.0 mm.

In the honeycomb structured body of the present invention, a noble metal is preferably supported on the honeycomb fired body. The honeycomb structured body in which a noble metal that functions as a catalyst is supported on the honeycomb fired body can be used as a honeycomb catalytic converter for exhaust gas conversion.

The noble metal catalyst is preferably a catalyst for a three-way catalytic converter.

The three-way catalytic converter refers to a catalytic converter that mainly converts hydrocarbons (HC), carbon monoxide (CO), and nitrogen oxides (NOx). Examples of the noble metal that is used in the three-way catalytic converter include noble metals such as platinum, palladium, and rhodium.

In the honeycomb structured body of the present invention, the amount of the noble metal supported is preferably 0.1 to 15 g/L, more preferably 0.1 to 10 g/L.

The term "amount of the noble metal supported" as used herein refers to the weight of the noble metal per apparent volume of the honeycomb structured body. The apparent volume of the honeycomb structured body includes the pore volumes. It includes the volume of the peripheral coat layer and/or the volume of an adhesive layer.

(Method for Producing a Honeycomb Structured Body)

Next, the method for producing a honeycomb structured body of the present invention is described.

The method for producing a honeycomb structured body of the present invention is a method for producing a honeycomb structured body including a honeycomb fired body in which multiple through-holes are arranged longitudinally in parallel with one another with a partition wall therebetween, the method including: a raw material paste preparing step of preparing a raw material paste; a molding step of molding the raw material paste into a honeycomb molded body in which multiple through-holes are arranged longitudinally in parallel with one another with a partition wall therebetween; a drying step of drying the honeycomb molded body obtained in the molding step; and a firing step of firing the honeycomb molded body dried in the drying step into a honeycomb fired body, wherein the raw material paste contains, relative to the total solid residue in the raw material paste after the firing step, 40 to 60% by weight of CZ particles, 15 to 35% by weight of θ-alumina particles, 5 to 15% by weight of α-alumina fibers, 5 to 20% by weight of boehmite as a binder, and one or more pore-forming agents.

According to the method for producing a honeycomb structured body, since the CZ particles, θ-alumina particles, α-alumina fibers, and boehmite in the percentages described above, and one or more pore-forming agents are used, the method can produce a honeycomb structured body which exhibits excellent mechanical characteristics while its porosity is high, and which exhibits excellent conversion performance when used as a honeycomb catalytic converter.

(Raw Material Paste Preparing Step)

The method for producing a honeycomb structured body of the present invention first involves a raw material paste preparing step of preparing a raw material paste, wherein the raw material paste contains, relative to the total solid residue in the raw material paste after the firing step, 40 to 60% by weight of CZ particles, 15 to 35% by weight of θ-alumina particles, 5 to 15% by weight of α-alumina fibers, 5 to 20% by weight of boehmite as a binder, and one or more pore-forming agents.

The CZ particles are used as co-catalysts and function to enhance the catalytic action of a catalyst supported. If the CZ particle content is less than 40% by weight, its function to enhance the catalytic action will be reduced. Thus, there is no advantage in using the CZ particles. In contrast, if the CZ particle content is more than 60% by weight, the percentages of other materials such as the θ-alumina will be low, making it difficult to produce a honeycomb fired body having heat resistance.

If the θ-alumina particle content is less than 15% by weight, it will be difficult to control the pore size distribution, making it difficult to produce a honeycomb fired body that exhibits excellent conversion performance. In contrast, if the θ-alumina particle content is more than 35% by weight, the percentage of the CZ particles will be relatively low. Thus, the function of the CZ particles to enhance the catalytic action will be reduced.

In addition, the weight ratio of the CZ particles to the θ-alumina particles (CZ particles/θ-alumina particles) is preferably 1.0 to 3.0.

The CZ particle content is high when the weight ratio (CZ particles/θ-alumina particles) is 1.0 to 3.0, and the CZ particles are used as co-catalysts. Thus, the CZ particles can enhance the action of a catalyst supported, making it possible to further improve the performance of the honeycomb structured body as a honeycomb catalytic converter.

If the α-alumina fiber content is less than 5% by weight, the degree to which the fibers can strengthen the fired body will be low, reducing the mechanical characteristics of the honeycomb fired body. In contrast, if the α-alumina fiber content is more than 15% by weight, the percentage of other materials will be low, resulting in poor conversion performance.

If the boehmite content is less than 5% by weight, the viscosity of the raw material paste will be low because the binder content is too low, making it difficult to extrusion-mold the raw material paste. In contrast, if the boehmite content is more than 20% by weight, the viscosity of the raw material paste will be too low because the amount of the boehmite is too large, again, making it difficult to form a predetermined shape by extrusion-molding.

The average particle size of the alumina particles, particularly the average particle size of the θ-alumina particles, is preferably 1 to 5 μm. While the average particle size of the CZ particles is also preferably 1 to 5 μm, the average particle size of the alumina particles to be used is preferably larger than the average particle size of the CZ particles.

The average particle sizes of the alumina particles and the CZ particles to be used as raw materials can be measured using a laser diffraction particle size distribution meter (Mastersizer 2000 available from Malvern Panalytical).

With the use of the CZ particles, θ-alumina particles, α-alumina fibers, and boehmite in the percentages described above, and one or more pore-forming agents, it is possible to produce a honeycomb fired body having a porosity of 55 to 70% and exhibiting excellent warm-up performance.

Any pore-forming agent may be used. Examples include acrylic resin, coke, and starch. In the present invention, at least two of acrylic resin, coke, and starch are preferably used.

The pore-forming agents are used to create pores in a fired body when producing the fired body. The pore-forming agent content is preferably 1 to 10% by weight relative to the raw material paste as a whole.

Examples of other raw materials for use in preparation of the raw material paste include organic binders, pore-forming agents, forming auxiliaries, and dispersion media.

Any organic binder may be used. Examples include methyl cellulose, carboxymethyl cellulose, hydroxyethyl cellulose, polyethylene glycol, phenolic resin, and epoxy resin. Two or more of these may be used in combination.

Any dispersion medium may be used. Examples include water and organic solvents such as benzene and alcohols such as methanol. Two or more of these may be used in combination.

Any forming auxiliary may be used. Examples include ethylene glycol, dextrins, fatty acids, fatty acid soaps, and polyalcohols. Two or more of these may be used in combination.

Preparation of the raw material paste preferably involves mixing/kneading of the above raw materials. A device such as a mixer or an attritor may be used for mixing, and a device such as a kneader may be used for kneading.

(Molding Step)

In the method for producing a honeycomb structured body of the present invention, the raw material paste prepared by the above method is molded into a honeycomb molded body in which multiple through-holes are arranged longitudinally in parallel with one another with a partition wall therebetween. Specifically, the raw material paste is extrusion-molded into a honeycomb molded body.

Specifically, the raw material paste is passed through an extrusion-molding die of a specific shape to form a continuous honeycomb molded body having through-holes of a specific shape, and the continuous honeycomb molded body is cut to a specific length, whereby a honeycomb molded body is obtained.
(Drying Step)

The method for producing a honeycomb structured body of the present invention includes drying the honeycomb molded body obtained in the molding step.

Here, preferably, a dryer such as a microwave dryer, a hot-air dryer, a dielectric dryer, a reduced-pressure dryer, a vacuum dryer, or a freeze-dryer is used to dry the honeycomb molded body into a honeycomb dried body. In particular, microwave drying and freeze-drying that uses a freeze-dryer are preferred.

More preferably, freeze-drying involves pressure reduction after freezing the honeycomb molded body.

Preferred freezing conditions for freeze-drying are as follows: freezing a honeycomb molded body at −30° C. or lower for 1 to 48 hours; and subjecting the frozen honeycomb molded body to a reduced pressure of 1 to 600 Pa to sublimate the water under reduced pressure for 1 to 120 hours.

Freeze-drying of the honeycomb molded body allows a large amount of the water in the raw material paste to sublimate directly from the frozen state. Thus, the macropores can be easily formed, and it is possible to increase the size of the macropores. Thus, the method can produce a honeycomb structured body in which surrounding exhaust gas easily diffuses into the pores and which exhibits higher conversion performance when used as a honeycomb catalytic converter.

Herein, the honeycomb molded body before drying, the honeycomb molded body before the firing step, and the honeycomb dried body are also collectively referred to as a "honeycomb molded body".
(Firing Step)

In the method for producing a honeycomb structured body of the present invention, the honeycomb molded body dried in the drying step is fired in the firing step into a honeycomb fired body. In this step, the honeycomb molded body is degreased and fired. Thus, the step can also be referred to as a "degreasing/firing step", but is referred to as a "firing step" for the purpose of convenience.

The temperature in the firing step is preferably 800° C. to 1300° C., more preferably 900° C. to 1200° C. The duration of the firing step is preferably 1 to 24 hours, more preferably 3 to 18 hours.

The atmosphere of the firing step is not particularly limited, but an atmosphere with an oxygen concentration of 1 to 20% by volume is preferred.

The honeycomb structured body including a honeycomb fired body of the present invention can be produced by the above steps.
(Supporting Step)

The method for producing a honeycomb structured body of the present invention preferably further includes a supporting step of allowing a noble metal to be supported on the honeycomb fired body.

Examples of the method for allowing a noble metal to be supported on the honeycomb fired body include a method in which the honeycomb fired body or the honeycomb structured body is immersed in a solution containing noble metal particles or a noble metal complex, and the honeycomb fired body or the honeycomb structured body is then removed and heated.

When the honeycomb structured body includes a peripheral coat layer, a noble metal may be supported on the honeycomb fired body before the peripheral coat layer is formed, or a noble metal may be supported on the honeycomb fired body or the honeycomb structured body after the peripheral coat layer is formed.

In the method for producing a honeycomb structured body of the present invention, the amount of the noble metal supported in the supporting step is preferably 0.1 to 15 g/L, more preferably 0.5 to 10 g/L.
(Other Steps)

In the case where the method for producing a honeycomb structured body of the present invention includes forming a peripheral coat layer on the outer periphery of the honeycomb fired body, the peripheral coat layer can be formed by applying a peripheral coat layer paste to the outer periphery of the honeycomb fired body excluding both end faces thereof, and then solidifying the peripheral coat layer paste by drying. A paste having the same composition as the raw material paste can be used as the peripheral coat layer paste.

EXAMPLES

Examples that more specifically disclose the present invention are described below. The present invention is not limited to these examples.
(Preparation of Evaluation Sample)

Example 1

The following materials were mixed/kneaded to prepare a raw material paste: 5279 parts by weight of CZ particles (average particle size: 2 μm); 2640 parts by weight of θ-alumina particles (average particle size: 2 μm); 1056 parts by weight of α-alumina fibers (average fiber diameter: 3 μm, average fiber length: 60 μm); 2262 parts by weight of boehmite as an inorganic binder; 1060 parts by weight of methyl cellulose as an organic binder; 422 parts by weight of acrylic resin as a pore-forming, agent; 528 parts by weight of coke also as a pore-forming agent; 845 parts by weight of polyoxyethylene oleyl ether (surfactant) as a forming auxiliary; and 5820 parts by weight of ion-exchanged water. The forming auxiliary has a viscosity at 30° C. of 50 mPa·s.

The percentage of each component relative to the total solid residue in the raw material paste after the firing step was as follows: CZ particles: 50% by weight, θ-alumina particles: 25% by weight, α-alumina fibers: 10% by weight, boehmite: 15% by weight.

The average particle sizes of the alumina particles and the CZ particles were determined by taking an SEM image with a scanning electron microscope (SEM "S-4800" available from Hitachi High-Technologies Corporation), and measuring the length of 100 particles. The measurement conditions were as follows: acceleration voltage: 1 kV, emission: 10 μA, WD: 2.2 mm or less.

Using an extruder, the raw material paste was extrusion-molded into a round pillar-shaped honeycomb molded body. Then, using a reduced-pressure microwave dryer, the honeycomb molded body was dried at an output of 1.74 kW under a reduced pressure of 6.7 kPa for 12 minutes, and then degreased/fired at 1100° C. for 10 hours, whereby a honeycomb fired body (honeycomb structured body) was produced. The honeycomb fired body had a round pillar shape with a diameter of 103 mm and a length of 80 mm in which the density of the through-holes was 77.5 pcs/cm$^2$ (500 cpsi) and the thickness of the partition wall was 0.127 mm (5 mil).

Example 2

The following materials were mixed/kneaded to prepare a raw material paste: 6500 parts by weight of CZ particles (average particle size: 2 μm); 2700 parts by weight of θ-alumina particles (average particle size: 2 μm); 780 parts by weight of boehmite as an inorganic binder; 1080 parts by weight of a-alumina fibers (average fiber diameter: 3 μm, average fiber length: 60 μm); 1080 parts by weight of methyl cellulose as an organic binder; 440 parts by weight of acrylic resin as a pore-forming agent; 540 parts by weight of coke also as a pore-forming agent; 860 parts by weight of polyoxyethylene oleyl ether (surfactant) as a forming auxiliary; and 6020 parts by weight of ion-exchanged water.

The percentage of each component relative to the total solid residue in the raw material paste after the firing step was as follows: CZ particles: 60% by weight, θ-alumina particles: 25% by weight, α-alumina fibers: 10% by weight, boehmite: 5% by weight.

Except for the above differences, a honeycomb fired body (honeycomb structured body) was produced as in Example 1.

Comparative Example 1

A honeycomb fired body was produced as in Example 1, except that the raw material paste was prepared by mixing/kneading the following components: 3000 parts by weight of CZ particles(average particle size: 2 μm); 2500 parts by weight of θ-alumina particles (average particle size: 2 μm); 1000 parts by weight of α-alumina fibers (average fiber diameter: 3 μm, average fiber length: 60 μm); 5000 parts by weight of boehmite as an inorganic binder; 1000 parts by weight of methyl cellulose as an organic binder; 400 parts by weight of acrylic resin as a pore-forming agent; 500 parts by weight of coke also as a pore-forming agent; 800 parts by weight of polyoxyethylene oleyl ether (surfactant) as a forming auxiliary; and 5800 parts by weight of ion-exchanged water.

The percentage of each component relative to the total solid residue in the raw material paste after the firing step was as follows: CZ particles: 30% by weight, θ-alumina particles: 25% by weight, α-alumina fibers: 10% by weight, boehmite: 35% by weight.

Comparative Example 2

A honeycomb fired body was produced as in Example 1, except that the raw material paste was prepared by mixing/kneading the following components: 4020 parts by weight of CZ particles (average particle size: 2 μm); 2520 parts by weight of θ-alumina particles (average particle size: 2 μm); 1000 parts by weight of α-alumina fibers (average fiber diameter: 3 μm, average fiber length: 60 μm); 3600 parts by weight of boehmite as an inorganic binder; 1000 parts by weight of methyl cellulose as an organic binder; 400 parts by weight of acrylic resin as a pore-forming agent; 500 parts by weight of coke also as a pore-forming agent; 800 parts by weight of polyoxyethylene oleyl ether (surfactant) as a forming auxiliary; and 6160 parts by weight of ion-exchanged water.

The percentage of each component relative to the total solid residue in the raw material paste after the firing step was as follows: CZ particles: 40% by weight, θ-alumina particles: 25% by weight, α-alumina fibers: 10% by weight, boehmite: 25% by weight.

(Supporting Noble Metal)

A dinitrodiammine palladium nitrate solution ([Pd(NH$_3$)$_2$(NO$_2$)$_2$]HNO$_3$, palladium concentration: 100 g/L) and a rhodium nitrate solution ([Rh(NO$_3$)$_3$], rhodium concentration: 50 g/L) were mixed at a volume ratio of 3:1 to prepare a mixed solution. The honeycomb fired bodies of Examples 1 and 2 and Comparative Examples 1 and 2 produced by the above steps were immersed in this mixed solution and kept therein for 15 minutes. Subsequently, each honeycomb fired body was dried at 110° C. for two hours, and fired at 500° C. in a nitrogen atmosphere for one hour so as to allow palladium and rhodium catalysts to be supported on the honeycomb fired body.

The amount of the supported catalysts (i.e., the total amount of palladium and rhodium) was 0.14 g/L per apparent volume of the honeycomb fired body.

(Component Analysis)

The honeycomb fired bodies according to Examples 1 and 2 and Comparative Examples 1 and 2 before the catalysts were supported thereon, which were produced by the above method, were each cut into a cubic with a side of about 0.8 cm, and then set in a sample horizontal-type multipurpose X-ray diffraction system (Ultima IV available from Rigaku Corporation) for X-ray diffraction analysis. Thus, the presence of the CZ particles, θ-alumina particles, γ-alumina, and α-alumina fibers in the honeycomb fired bodies according to Examples 1 and 2 and Comparative Examples 1 and 2 can be confirmed.

(Porosity measurement)

The fired bodies before the catalysts were supported thereon, which were produced in Examples 1 and 2 and Comparative Examples 1 and 2, were measured for porosity by mercury porosimetry.

The specific measurement procedure of mercury porosimetry was as follows: each honeycomb fired body was cut into a cubic with a side of about 0.8 cm, and each cubic was ultrasonically washed with ion-exchanged water and sufficiently dried to obtain a measurement sample. Next, the pore size of the measurement sample was measured using an automated porosimeter "Micromeritics AutoPore III 9405" available from Shimadzu Corporation with a contact angle of 130° and a surface tension of 485 mN/m. The measurement range was 0.005 to 100 μm. Table 1 shows the measurement results.

Warm-up Performance valuation) Each of the honeycomb fired bodies with the noble metals supported thereon, which were produced in the examples and the comparative examples, was set in a V6 3.5 L engine, and the time required from when the engine has started to run stoichiometrically to when the HC concentration ((HC inflow-HC outflow)/(HC inflow) x 100) was 50% or less was measured to evaluate catalyst warm-up performance.

TABLE 1

|  | Porosity [%] | Time required for HC concentration to be 50% or less [sec] |
|---|---|---|
| Example 1 | 55 | 14 |
| Example 2 | 59.8 | 12 |
| Comparative Example 1 | 51.2 | 18 |
| Comparative Example 2 | 52.4 | 16 |

As shown in Table 1, the honeycomb fired body according to Example 1 had a porosity of 55%, and the honeycomb fired body according to Example 2 had a porosity of 59.8%. These porosities were in the porosity range recited in claim 1. The honeycomb fired body according to Comparative Example 1 had a porosity of 51.2%, and the honeycomb fired body according to Comparative Example 2 had a porosity of 52.4%. These porosities were outside the porosity range recited in claim 1.

The time required for the HC concentration to be 50% or less was 14 seconds in Example 1 and 12 seconds in Example 2, whereas it was 18 seconds in Comparative Example 1 and 16 seconds in Comparative Example 2. The HC concentration reached 50% or less in a shorter time in Examples 1 and 2 than in Comparative Examples 1 and 2. This shows that the fired bodies according to Examples 1 and 2 were excellent in warm-up performance and conversion performance.

REFERENCE SIGNS LIST

10 honeycomb structured body
11 honeycomb fired body
11a through-hole
11b partition wall

The invention claimed is:

1. A honeycomb structured body comprising:
    a honeycomb fired body in which multiple through-holes are arranged longitudinally in parallel with one another with a partition wall therebetween,
    wherein the honeycomb fired body is an extrudate containing ceria-zirconia composite oxide particles, θ-alumina particles, γ-alumina, and α-alumina fibers, and
    the honeycomb fired body has a porosity of 55 to 70%.
2. The honeycomb structured body according to claim 1,
    wherein a noble metal is supported on the honeycomb fired body.
3. A method for producing the honeycomb structured body of claim 1, the method comprising:
    a raw material paste preparing step of preparing a raw material paste;
    a molding step of molding the raw material paste into a honeycomb molded body in which multiple through-holes are arranged longitudinally in parallel with one another with a partition wall therebetween;
    a drying step of drying the honeycomb molded body obtained in the molding step; and
    a firing step of firing the honeycomb molded body dried in the drying step into a honeycomb fired body,
    wherein the raw material paste contains, relative to the total solid residue in the raw material paste after the firing step, 40 to 60% by weight of ceria-zirconia composite oxide particles, 15 to 35% by weight of θθ-alumina particles, 5 to 15% by weight of α-alumina fibers, 5 to 20% by weight of boehmite as a binder, and one or more pore-forming agents.
4. The method for producing a honeycomb structured body according to claim 3,
    wherein at least two of acrylic resin, coke, and starch are used as the pore-forming agents.
5. The method for producing a honeycomb structured body according to claim 3,
    wherein the honeycomb molded body obtained in the molding step is freeze-dried in the drying step.
6. The method for producing a honeycomb structured body according to claim 3,
    further comprising a supporting step of allowing a noble metal to be supported on the honeycomb fired body.
7. The method for producing a honeycomb structured body according to claim 4,
    wherein the honeycomb molded body obtained in the molding step is freeze-dried in the drying step.
8. The method for producing a honeycomb structured body according to claim 4,
    further comprising a supporting step of allowing a noble metal to be supported on the honeycomb fired body.
9. The method for producing a honeycomb structured body according to claim 5,
    further comprising a supporting step of allowing a noble metal to be supported on the honeycomb fired body.
10. The honeycomb structured body according to claim 1, wherein a peripheral surface of the honeycomb fired body is not coated.
11. The honeycomb structured body according to claim 1, further comprising:
    a peripheral coat layer provided on a peripheral surface of the honeycomb fired body and made by solidifying a peripheral coat layer paste by drying, the peripheral coat layer paste containing ceria-zirconia composite oxide particles, θ-alumina particles, γ-alumina, and α-alumina fibers.

* * * * *